May 2, 1967    GEN TAKEYA ETAL    3,316,750

DTA APPARATUS

Filed Feb. 5, 1964

United States Patent Office 3,316,750
Patented May 2, 1967

3,316,750
DTA APPARATUS
Gen Takeya, 1375-1, West 14, South 8; Kazuo Makino, 35, West 14, North 15; and Tadao Ishii, 801-301, Asomachi; all of Sapporo, Hokkaido, Japan.
Filed Feb. 5, 1964, Ser. No. 342,828
6 Claims. (Cl. 73—15)

The present invention relates to an improved apparatus for differential thermal analysis (DTA) and more particularly to an automatic recording DTA apparatus for analyzing heterogeneous reaction systems under normal or high pressure.

In the DTA in a system consisting of two components in three phases, such as solid and liquid phases, liquid and liquid phases, or liquid and gaseous phases, it is very important to measure the actual degree or rate of agitation in the reaction sample to be analyzed. Because in such heterogeneous reaction systems, the agitation of substances exerts a direct influence upon the apparent rate of reaction and accordingly upon the rate of evolution of the reaction heat to be measured.

In general the influence of the agitation in question on reaction rate is extremely complicated. For example the apparent reaction rate in some cases is almost proportional to the rate of agitation while in other cases the reaction rate does not increase any longer when the agitation has already reached a certain rate. Some reactions hardly take place without agitating reaction substances while they take place only after the agitation of the reaction substances has reached a given rate.

Moreover the agitation of the sample produces heat evolution owing to the mechanical energy of agitation which makes it difficult to measure the heat of chemical reaction alone.

Thus, in order to measure the differential temperature between the reaction sample and the inert reference substance in the DTA of the heterogeneous reaction systems, it is most necessary to control and to estimate the degree of agitation of the sample, and at the same time to avoid the said thermal effect which might be caused by the mechanical agitation.

In various apparatus for differential thermal analysis in use at the present time, there is no simple means for analyzing the heterogeneous chemical reactions under pressure with a given rate of agitation.

An object of the present invention is to provide an improved apparatus for measuring the difference in the temperatures between the inert reference substance and the reaction sample under a controlled agitation as desired.

A further object of the invention is to provide a DTA apparatus which is capable of agitating or stirring equally both a sample and an inert reference substance in a respective vessel. A still further object of the invention is to minimize the error in the measurement of DTA by eliminating the thermal effect which might be produced by the mechanical agitation as mentioned above.

Another object of the invention is to provide a DTA apparatus which is capable of controlling the degree of agitation or the strength of stirring with respect to the sample.

A further object of the invention is to provide a DTA apparatus which is capable of heating the respective chambers or vessels for the inert reference substance and the reaction sample, equally and uniformly.

Yet another object of the invention is to provide a DTA apparatus in which the raising of the temperature in the respective vessels for the inert reference substance and reaction sample is controlled as desired.

The above and still further features, objects, and advantages of the invention will become apparent upon consideration of the following detailed description of a specific embodiment of the invention, especially when taken in conjunction with the accompanying drawings, wherein.

Figure 1:
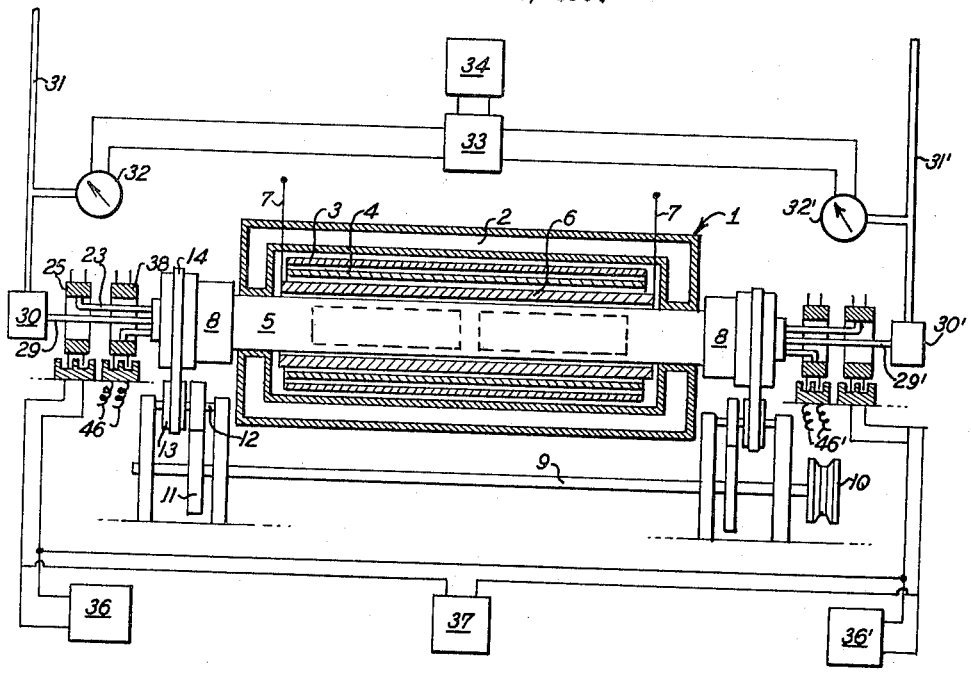
FIGURE 1 is a schematic representation of a DTA apparatus according to the present invention, in which a portion of the furnace is shown in section, with a circuit diagram.

In the embodiment of the DTA apparatus according to the present invention shown schematically in FIGURE 1, a furnace 1 is constituted by a cylindrical body having a double wall defining an inner space 2. The air in the inner space 2 is evacuated by suitable means such as a vacuum pump, not shown. One or more cylindrical heat shielding members 3 or 4 are provided in the furnace 1 coaxially therewith. The cylindrical furnace 1 is stationary and a rotatable cylinder 5 extends longitudinally through the furnace. The axis of the furnace coincides with that of the rotatable cylinder. Between the heat shielding members 3, 4 and the cylinder 5, there is disposed an electric heating means 6 which coaxially surrounds the cylinder 5. The electric heating means 6 generates heat to raise the temperature of the cylinder 5 and two chambers therein, by supplying electrical energy to its terminals 7 which are connected to a suitable voltage source, not shown.

The rotatable cylinder 5 which is preferably made of stainless steel is rotated by any suitable means. In the embodiment shown in FIGURE 1, insulated collars 8 are provided at both ends of the cylinder 5, which is driven by an electric motor, not shown. The motor drives a shaft 9 through a pulley 10 and a belt, not shown. The rotation of the shaft 9 is transmitted to a conventional gear train 11, to shaft 12 having a pulley 13, the revolution of which is transmitted to the cylinder 5 through a belt 14 fitted between the collar 8 and the pulley 13. These driving arrangements are provided at both ends of the cylinder 5, but they are not limited to the above arrangements since it will be apparent to those skilled in the art that any suitable transmission mechanisms may be employed for rotating the cylinder.

From the foregoing, it is apparent that the cylinder 5 can rotate at a desired rate and heating means 6 can heat the cylinder 5 at a desired rate of heating to a desired temperature. The temperature in the cylinder 5 is controlled at a predetermined rate by employing a programming control, if desired.

Figure 2:
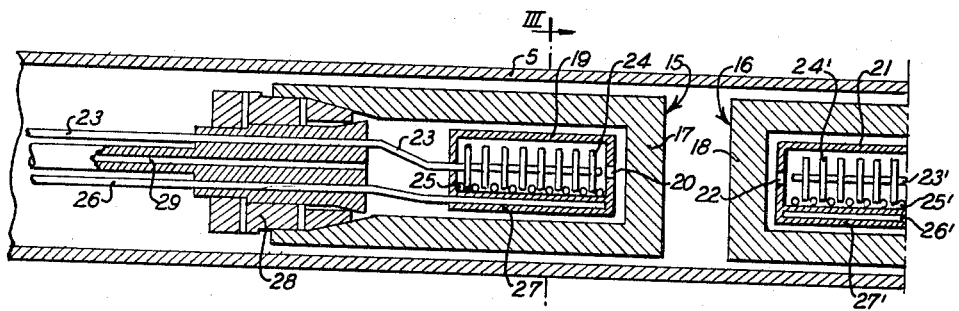
FIGURE 2 is a fragmentary view in section of a rotatable cylinder and a sample chamber comprising a sample vessel in the DTA apparatus shown in FIGURE 1.
Figure 3:
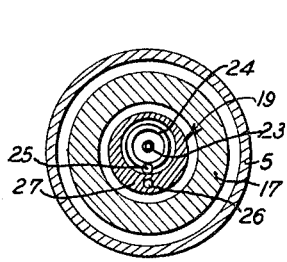
FIGURE 3 is a section along line III—III in FIGURE 2.

As shown in FIGURE 2, a cylindrical sample chamber 15 and a reference substance chamber 16 are coaxially disposed in mirror symmetry within a center portion of the hollow cylinder 5. Both sample and reference chambers, capable of withstanding a high working pressure, are made of stainless steel, and have respective closed end walls 17, 18 facing each other. A cylindrical sample vessel 19 having an opening 20 in an end wall thereof is disposed within the sample chamber 15 while a cylindrical reference substance vessel 21 having an opening 22 in an end wall thereof is disposed within the reference chamber 16. These sample and reference chambers and vessels are substantially identical in form, construction and arrangement, and therefore it will be enough for understanding these chambers and vessels, if one set is described. In order to simplify the explanation, the elements with respect to the reference chamber corresponding to the elements with respect to the sample chamber will be denoted in the specification and drawings by the same reference numeral with a prime ('). The end portion of a protective tube of a respective thermocouple 23, 23' is axially extended through an end wall of an associated vessel 19, 21 into the center of the vessel. A number of disc-like flanges or blade plates 24, 24' are radially extended from the protective tube of the respective thermocouples 23, 23' and balls 25, 25' are freely disposed between the disks 24, 24' so as to agitate or stir the sample or reference substance contained in each vessel. The cylindrical side walls of the vessels 19, 21 are variable in thickness as shown in FIGURE 3. An additional inner heater 26, 26' extends into the thick wall portion 27, 27' of the respective vessels 19, 21, said additional heater being used for the calibration of heat of chemical reaction to be measured in the sample vessel. The open end of each of the cylindrical chambers 15, 16 is sealed by a cap or cover means 28 so as to prevent the leakage of high pressure gas from chambers 15, 16. The thermocouples 23, 23' and the additional inner heaters 26, 26' respectively extend to the interior of the cylinder 5 through the cover means 28. Conduits 29, 29' for supplying high pressure gas into the respective chambers and vessels are connected to the associated cover means 28.

The conduits 29, 29' are connected through an associated automatic valve means 30, 30' to a respective conduit 31, 31' connected to a pressure gauge 32, 32' and to a high pressure gas source, not shown. The automatic valve means 30 is also connected to one input of a pressure gauge 32 and the electrical output of the gauge 32 is transmitted to differential means 33. The differential means 33 is also connected electrically to the automatic valve means 30' of the reference chamber 16. An output of the differential means 33 representing an electrical signal corresponding to the difference between the pressures in the sample chamber 15 and the reference substance chamber 16 is applied to an input of a recording means 34.

The thermocouple 23 is connected through a suitable and conventional contacting unit denoted by reference numeral 35 to a temperature recording means 36 and the inner heater 26 of the vessel 19 is connected through a conventional contacting unit 38, which is identical to the unit 35, and through conductors 46 to a voltage supply, not shown. The electrical output of the thermocouple 23 is also connected through the contacting unit 35 to one of two inputs of a differential temperature recording means 37 while the other input of recording means 37 is connected to the electrical output of the thermocouple 23' of the reference vessel 21.

Figure 4:
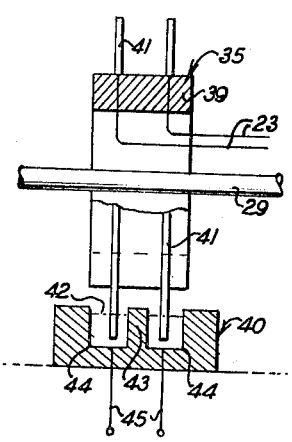
FIGURE 4 is an enlarged elevation view of an embodiment of a contacting unit to be used in a part of the DTA apparatus.

The construction of the contacting unit 35 or 38 is shown in FIGURE 4 in detail, and comprises an insulating ring body 39 rotating with the cylinder 5 and a stationary mercury tank 40. The conduit 29 passes through a central opening of the ring body 35 which has two contacting flanges 41 extending radially from the outside of the body. The mercury tank 49 consists of two mercury vessels 42 which are separated by a wall 43. The leads from the thermocouple 23 are connected to the respective flanges 41, as shown in FIGURE 4. A portion of the periphery of the flange 41 is always immersed in a mercury pool 44. Each of two mercury pools 44 is connected to a lead wire 45 separately, which is connected to the temperature recording means 36 and differential temperature recording means 37.

In operation of the DTA apparatus according to the present invention, a sample for example a liquid sample in a liquid-gas system, to be measured in comparison with an inert reference substance which is contained in the reference vessel 21 is put into the sample vessel 19. The rotatable cylinder 5 is rotated and thereby the balls 25 and 25' in the vessels 19 and 21 are moved therein so as to agitate the sample and the inert reference substance respectively. Under these conditions, the air in both sample and reference chambers 15 and 16 is withdrawn through the conduits 31 and 31' respectively, and thereafter the conduits 31 and 31' are connected to the high pressure gas supply. The pressure gas is introduced into both sample and reference changers 15 and 16 through the conduits 29 and 29', and into the sample vessel 19 and the reference vessel 21 through the openings 20 and 22, respectively. The temperatures of the sample and the reference chambers 15 and 16 are raised equally and linearly at a predetermined rate, by increasing the electrical current applied to the heating means 6 in accordance with a given program. The temperatures in the sample and reference vessel are respectively recorded by the temperature recording means 36 and 36', respectively.

If, for example, an exothermic reaction takes place between the sample liquid and the gas in the sample vessel 19 at a certain temperature, it results in a temperature difference between the sample vessel 19 and the reference vessel 21, owing to an evolution of reaction heat. The differential temperature between the sample vessel 19 and the reference vessel 21 is automatically recorded by the recording means 37.

Furthermore, according to the present invention, any definite small quantity of electrical energy can be supplied to the inner heater 26 through the leads 46 and the contacting unit 38, in another series of experiments in which thermograms for calibrating the heat of reaction of the sample are obtainable. Thus, from these thermograms a function is obtainable which enables to evaluate the exothermic heat in the chemical reaction in question.

In addition to the above, since the pressure recording means 34 shows the difference between the pressures in the sample vessel 19 and the reference vessel 21 in the course of the exothermic reaction, it gives a fairly accurate forecast of such reaction, and also serves for the differential thermal analysis.

Although the foregoing description has been made in connection with one embodiment of this invention, it is to be understood that various modifications may be made in the specific construction and arrangement disclosed therein without departing from the scope and spirit of the invention.

What is claimed is:

1. Apparatus for differential thermal analysis comprising a horizontally disposed cylindrical heating furnace, a rotatable cylindrical body mounted coaxially in said furnace, a sample vessel and a reference vessel each with an open end and a closed end axially positioned in said rotatable cylindrical body with their closed ends adjacent each other, means for closing said respective open ends, means for rotating the cylindrical body, and means for indicating the difference between the temperature in said sample vessel and in said reference vessel.

2. Apparatus according to claim 1, comprising electrical heating means in said cylindrical heating furnace.

3. Apparatus according to claim 1, comprising a thermocouple in each said sample vessel and reference vessel.

4. Apparatus according to claim 3, in which the thermocouple in each of said vessels comprises a protective tube and a plurality of disk-like flanges on said tube spaced axially therealong.

5. Apparatus according to claim 4, comprising a plurality of balls freely disposed between said flanges in each of said vessels.

6. Apparatus according to claim 2, comprising an additional electric heater for each vessel mounted therein.

References Cited by the Examiner
UNITED STATES PATENTS 3,084,534   4/1963   Goton _____ 73—15

OTHER REFERENCES

Dubriel, S. V., et al.: "The Differential Thermal Analysis Unit at Group GMX-3," in Los Alamos Scientific Laboratory Report, LAMS-2988, pages 38-40 relied on, Dec. 24, 1963.

RICHARD C. QUEISSER, *Primary Examiner.*

J. C. GOLDSTEIN, *Assistant Examiner.*